(12) United States Patent
Moon et al.

(10) Patent No.: US 10,872,725 B2
(45) Date of Patent: Dec. 22, 2020

(54) CERAMIC DIELECTRIC, METHOD OF MANUFACTURING THE SAME, CERAMIC ELECTRONIC COMPONENT, AND ELECTRONIC DEVICE

(71) Applicant: SAMSUNG ELECTRONICS CO., LTD., Suwon-si (KR)

(72) Inventors: Kyoung-Seok Moon, Hwaseong-si (KR); Hyeon Cheol Park, Hwaseong-si (KR); Chan Kwak, Yongin-si (KR); Hyun Sik Kim, Suwon-si (KR); Daejin Yang, Yeongju-si (KR); Youngjin Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 95 days.

(21) Appl. No.: 16/100,285

(22) Filed: Aug. 10, 2018

(65) Prior Publication Data
US 2019/0189345 A1 Jun. 20, 2019

(30) Foreign Application Priority Data
Dec. 19, 2017 (KR) .................. 10-2017-0175349

(51) Int. Cl.
*H01G 4/008* (2006.01)
*H01G 4/12* (2006.01)
(Continued)

(52) U.S. Cl.
CPC .......... *H01G 4/1227* (2013.01); *H01G 4/008* (2013.01); *H01G 4/30* (2013.01); *H01G 4/385* (2013.01)

(58) Field of Classification Search
CPC ........ H01G 4/1227; H01G 4/385; H01G 4/30; H01G 4/008
See application file for complete search history.

(56) References Cited

U.S. PATENT DOCUMENTS 4,388,294 A   6/1983  Poeppelmeier et al.
4,419,310 A   12/1983 Burn et al.
(Continued)

FOREIGN PATENT DOCUMENTS

JP   H06002589 B2   1/1994
JP   H07085460 B2   9/1995
(Continued)

OTHER PUBLICATIONS

Yongping et al. Influence of Rare Earths on Electric Properties and Microstructure of Barium Titanate Ceramics. Journal of Rare Earths. vol. 25, Suppl. , Jun. 2007, p. 154.*

(Continued)

*Primary Examiner* — Noah S Wiese
(74) *Attorney, Agent, or Firm* — Cantor Colburn LLP

(57) ABSTRACT

A ceramic dielectric includes a plurality of semi-conductive grains including a semiconductor oxide including barium (Ba), titanium (Ti), and a rare earth element. A ceramic dielectric also includes an insulative oxide located between adjacent semiconductor grains and an acceptor element including manganese (Mn), magnesium (Mg), aluminum (Al), iron (Fe), scandium (Sc), gallium (Ga), or a combination thereof, a method of manufacturing the ceramic dielectric, and a ceramic electronic component, and an electronic device including the ceramic dielectric.

26 Claims, 11 Drawing Sheets

(51) Int. Cl.
*H01G 4/30* (2006.01)
*H01G 4/38* (2006.01)

(56) References Cited

U.S. PATENT DOCUMENTS

| | | | |
|---|---|---|---|
| 5,004,715 A | 4/1991 | Hakotani et al. | |
| 6,205,015 B1* | 3/2001 | Wada | C04B 35/4682 361/313 |
| 7,157,165 B2 | 1/2007 | Ralph et al. | |
| 7,501,371 B2 | 3/2009 | Sasabayashi et al. | |
| 8,184,427 B2 | 5/2012 | Yamazaki | |
| 8,192,851 B2 | 6/2012 | Aman et al. | |
| 8,293,668 B2 | 10/2012 | Yono et al. | |
| 8,841,225 B2 | 9/2014 | Koga et al. | |
| 8,848,336 B2 | 9/2014 | Koutsaroff et al. | |
| 9,218,907 B2 | 12/2015 | Koutsaroff et al. | |
| 9,382,162 B2 | 7/2016 | Kang et al. | |
| 9,440,228 B2 | 9/2016 | Hosono et al. | |
| 9,666,371 B2 | 5/2017 | Morita et al. | |
| 9,928,959 B2 | 3/2018 | Yoon et al. | |
| 2007/0142209 A1* | 6/2007 | Ito | H01G 4/1227 501/137 |
| 2010/0209779 A1* | 8/2010 | Wendman | H01M 4/13 429/310 |
| 2012/0040187 A1* | 2/2012 | Yoo | C04B 35/18 428/403 |
| 2017/0022608 A1* | 1/2017 | King | H01G 4/1227 |

FOREIGN PATENT DOCUMENTS

| | | | |
|---|---|---|---|
| JP | 2615977 | B2 | 6/1997 |
| JP | 3418091 | B2 | 6/2003 |
| JP | 4423052 | B2 | 3/2010 |
| JP | 2011256091 | A | 12/2011 |
| JP | 2013543205 | A | 11/2013 |
| JP | 5372034 | B2 | 12/2013 |
| KR | 1019930014641 | A | 7/1993 |
| KR | 1020110004904 | A | 1/2011 |
| KR | 1020170005647 | A | 1/2017 |
| KR | 1020170017285 | A | 2/2017 |
| KR | 1020170046341 | A | 5/2017 |
| WO | 2011125543 | A1 | 10/2011 |
| WO | 2013008705 | A1 | 1/2013 |

OTHER PUBLICATIONS

Ching-Fong Chen et al., "Oxygen-deficient BaTiO3-X perovskite as an efficient bifunctional oxygen electrocatalyst", Nano Energy, Apr. 2015, pp. 423-432, vol. 13.

Do Duc Cuong et al., "Electronic Structure of Oxygen Deficient BaTiO3", Integrated Ferroelectrics (An International Journal), Published online: Mar. 10, 2011, pp. 23-30, vol. 84, 2006—Issue 1.

Jean Ravez et al., "Lead-free ferroelectric relaxor ceramics in the BaTiO3—BaZrO3—CaTiO3 system", Journal of Material Chemistry, Apr. 1999, pp. 1609-1613, vol. 9.

Sang-Chae Jeon et al., "Coherency strain enhanced dielectric-temperature property of rare-earth doped BaTiO3", Applied Physics Letters, Published Online: Mar. 22, 2013, pp. 112915-1~5, vol. 102.

Yao Shuai et al., "Decisive role of oxygen vacancy in ferroelectric versus ferromagnetic Mn-doped BaTiO3 thin films", Journal of Applied Physics, Published Online: Apr. 21, 2011, pp. 084105-1~05415-8, vol. 109.

* cited by examiner

A-A'

CERAMIC DIELECTRIC, METHOD OF MANUFACTURING THE SAME, CERAMIC ELECTRONIC COMPONENT, AND ELECTRONIC DEVICE

CROSS-REFERENCE TO RELATED APPLICATION

This application claims priority to Korean Patent Application No. 10-2017-0175349, filed in the Korean Intellectual Property Office on Dec. 19, 2017, and all the benefits accruing therefrom under 35 U.S.C. § 119, the entire contents of which are incorporated herein by reference.

BACKGROUND

1. Field

A ceramic dielectric, a method of manufacturing the ceramic dielectric, a ceramic electronic component, and an electronic device including the ceramic dielectric are disclosed.

2. Description of the Related Art

Many electronic components utilize ceramic materials. The components can include a capacitor, an inductor, a piezoelectric device, a varistor, or a thermistor, etc. Among them, the capacitors are electronic components used for obtaining capacitance in electronic circuits. A multilayer ceramic capacitor ("MLCC"), which is one example of the capacitor, can include a plurality of capacitors. The MLCC may be formed in, for example, a chip shape, so that it may be mounted in a flexible printed circuit ("FPC"). The MLCC may be used in various electronic devices such as an image device of a liquid crystal display ("LCD"), a computer, a mobile phone, and the like to charge and discharge electricity, and it may be used in a device for coupling, decoupling, impedance matching, and the like. Generally, design criteria for electronic devices, and any corresponding MLCCs, can include function, efficiency, size, and overall performance.

Recently, according to requirements for providing an electronic device with a high function, a high efficiency, and a smaller size, a ceramic electronic component such as a multilayer ceramic capacitor mounted in the electronic device having a high performance and a smaller size is also needed.

SUMMARY

An embodiment provides a ceramic dielectric having both a high dielectric constant and a high resistivity.

Another embodiment provides a method of manufacturing the ceramic dielectric.

Yet another embodiment provides a ceramic electronic component including the ceramic dielectric.

Still another embodiment provides an electronic device including the ceramic electronic component.

According to an embodiment, a ceramic dielectric includes: a plurality of semiconductor grains, wherein one or more of the semiconductor grains includes a semiconductor oxide, the semiconductor oxide including barium (Ba), titanium (Ti) and a rare earth element, and an insulative oxide between adjacent semiconductor grains and including an acceptor element, wherein the acceptor element comprises manganese (Mn), magnesium (Mg), aluminum (Al), iron (Fe), scandium (Sc), gallium (Ga), or a combination thereof.

A distribution of the rare earth element may be throughout the entirety of the one or more semiconductor grains.

One or more of the semiconductor grains may further include a surface and a center, wherein a concentration of the rare earth element is uniform, i.e, does not have a concentration gradient from the surface to the center of the semiconductor grain.

The semiconductor oxide may have a crystal structure, wherein the crystal structure includes an oxygen vacancy.

The semiconductor oxide may have a perovskite structure, wherein the semiconductor oxide may be $BaTiO_3$, and wherein the rare earth element may be a donor element that substitutes a portion of a barium site in the $BaTiO_3$.

One or more of the semiconductor grains may include a semiconductor oxide represented by Chemical Formula 1.

   Chemical Formula 1

In Chemical Formula 1,
RE is the at least one rare earth element,
$0<x\leq0.02$, and
$0<\delta<3$.

The rare earth element may include lanthanum (La), yttrium (Y), bismuth (Bi), dysprosium (Dy), neodymium (Nd), samarium (Sm), holmium (Ho), or a combination thereof.

An amount of the rare earth element may be less than or equal to about 1 mole with respect to 100 mole of titanium (Ti).

An amount of the acceptor element may be about 0.5 mole to about 2 mole with respect to 100 mole of titanium (Ti).

The insulative oxide may be represented by Chemical Formula 2 below.

   Chemical Formula 2

In Chemical Formula 2,
M may be manganese (Mn), magnesium (Mg), aluminum (Al), iron (Fe), scandium (Sc), gallium (Ga), or a combination thereof.

The insulative oxide may form a grain boundary located between adjacent semiconductor grains.

One or more of the semiconductor grains may include a surface, a diameter, and the acceptor element, diffused from the grain boundary, wherein a distribution of the acceptor element for the one or more semiconductor grains, starting from the surface, may be greater than or equal to about 10 percent of the diameter.

The grain boundary may have an amount of the acceptor element that is greater than or equal to about 1.2 times an amount of the acceptor element in the plurality of semiconductor grains.

The ceramic dielectric may have a dielectric constant of greater than or equal to about 6,000 and/or a resistivity of greater than or equal to about $1\times10^{10}$ ohm centimeters at room temperature.

According to another embodiment, a ceramic dielectric includes: a grain that includes barium (Ba); titanium (Ti); and a donor element including lanthanum (La), yttrium (Y), bismuth (Bi), dysprosium (Dy), neodymium (Nd), samarium (Sm), holmium (Ho), or combination thereof; and a grain boundary that includes an acceptor element, the acceptor element including manganese (Mn), magnesium (Mg), aluminum (Al), iron (Fe), scandium (Sc), gallium (Ga), or a combination thereof, wherein the barium (Ba), the titanium (Ti), and the donor element are non-locally distributed in the grain.

The grain may have a crystal structure, wherein the crystal structure includes an oxygen vacancy.

An amount of the donor element may be less than or equal to about 1 mole with respect to 100 mole of titanium (Ti).

An amount of the acceptor element may be about 0.5 mole to about 2 mole with respect to 100 mole of titanium (Ti).

The grain may include the acceptor element of, for example diffused from, diffused from the grain boundary and the acceptor element may be distributed within about 10% of a particle diameter of the grain from a surface of the grain.

The grain may be a semiconductor and/or the grain boundary may be an insulator.

According to yet another embodiment, a method of manufacturing a ceramic dielectric includes: heating a barium precursor, a titanium precursor, and a rare earth element precursor to obtain a barium titanium oxide doped with a rare earth element, mixing the barium titanium oxide doped with the rare earth element with an acceptor element precursor to obtain a mixture, wherein the acceptor element precursor includes manganese (Mn), magnesium (Mg), aluminum (Al), iron (Fe), scandium (Sc), gallium (Ga), or a combination thereof, and sintering the mixture to obtain a plurality of grains including the barium titanium oxide doped with the rare earth element and an insulative oxide located between adjacent grains, wherein sintering the mixture includes primary heat treatment under a reduction atmosphere and secondary heat treatment under an oxidizing atmosphere.

An amount of the rare earth element precursor may be less than or equal to about 1 mole with respect to 100 mole of the titanium precursor.

An amount of the acceptor element precursor may be about 0.5 mole to about 2 mole with respect to 100 mole of the titanium precursor.

The reduction atmosphere may include a $N_2/H_2$ mixed gas and a temperature of the reduction atmosphere may be about 1100° C. to about 1400° C.

The oxidizing atmosphere may include air and/or wet $N_2$ and a temperature of the oxidizing atmosphere may be about 600° C. to about 800° C.

The method may further include compression-molding the mixture prior to sintering the mixture.

According to another embodiment, a ceramic electronic component includes a pair of electrodes facing each other and a ceramic dielectric layer located between the pair of the electrodes, wherein the ceramic dielectric layer includes a plurality of semiconductor grains, wherein one or more of the semiconductor grains comprises a semiconductor oxide, wherein the semiconductor oxide comprises barium, titanium, and a rare earth element; and an insulative oxide comprising an acceptor element, wherein the insulative oxide is located between adjacent semiconductor grains and wherein the acceptor element comprises manganese, magnesium, aluminum, iron, scandium, gallium, or a combination thereof.

The ceramic electronic component may include a multilayer ceramic capacitor, wherein the multilayer ceramic capacitor includes a plurality of unit capacitors, and wherein the pair of the electrodes and/or the ceramic dielectric layer may be laminated. According to another embodiment, an electronic device includes the ceramic electronic component.

The ceramic electronic component may have both a high dielectric constant and a high resistivity. For example, the ceramic electronic component may have a dielectric constant of greater than or equal to about 6,000 and a resistivity of greater than or equal to about $1 \times 10^{10}$ ohm centimeters at room temperature.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
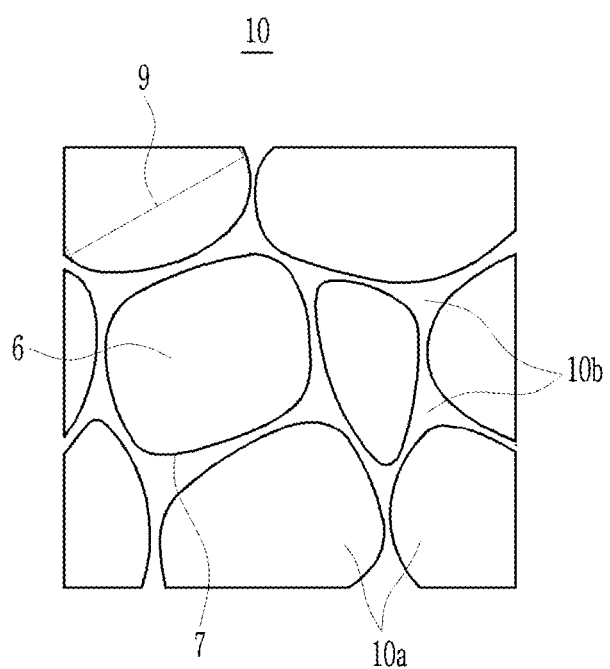
FIG. 1 is a schematic view illustrating an exemplary embodiment of a ceramic dielectric according to the present invention.

Hereinafter, example embodiments of the present disclosure will be described in detail so that a person skilled in the art would understand the same. This disclosure may, however, be embodied in many different forms and is not construed as limited to the example embodiments set forth herein. Rather, these embodiments are provided so that this disclosure will be thorough and complete, and will fully convey the scope of the invention to those skilled in the art.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a ceramic dielectric according to an embodiment is described.

FIG. 1 is a schematic view of a ceramic dielectric according to an embodiment.

Referring to FIG. 1, a ceramic dielectric 10 according to an embodiment includes a plurality of grains 10a and a grain boundary 10b located between adjacent grains 10a. The grains 10a may also include a center 6, a surface 7, and a diameter 9. As used herein, the "diameter" of an irregular particle is the longest distance across the particle.

The grains 10a may be a three-dimensional bulk dielectric. The grains 10a may include a metal oxide, for example, a metal oxide including barium (Ba) and/or strontium (Sr), titanium (Ti), and a rare earth element. The rare earth element may include, for example, lanthanum (La), yttrium (Y), bismuth (Bi), dysprosium (Dy), neodymium (Nd), samarium (Sm), holmium (Ho), or a combination thereof, but is not limited thereto. The rare earth element may include, for example, lanthanum (La).

In an embodiment, the grains 10a may include a metal oxide including barium (Ba), titanium (Ti), and a rare earth element. The metal oxide may be, for example, barium titanium oxide doped with the rare earth element. The barium titanium oxide doped with the rare earth element includes barium (Ba), titanium (Ti), and a rare earth element which may have no concentration gradient (e.g., uniform distribution) from the surface 7 of the grains 10a to the center 6. This may be achieved, for example, by uniformly mixing a barium precursor, a titanium precursor, and a rare earth element precursor. The resulting distribution may be non-local and uniform through the entirety of the grains 10a.

The metal oxide in the grains 10a may have a predetermined crystal structure thereof. For example, the barium titanium oxide doped with a rare earth element may have a modified perovskite structure. The rare earth element may be a donor element substituting a part of the barium (Ba) site in $BaTiO_3$ of a perovskite structure and may control conductivity of the grains 10a according to an amount of the donor element. One or more of the plurality, preferably all, of grains 10a may be free of an insulative metal oxide.

The rare earth element may be included in an amount less than or equal to about 1 mol, for example less than or equal to about 0.9 mol, or less than or equal to about 0.8 mol based on 100 mol of titanium (Ti) in the grains 10a. Within the ranges, the rare earth element may be included in an amount of for example about 0.2 mol to about 1 mol, about 0.2 mol to about 0.9 mol, about 0.3 mol to about 0.8 mol, about 0.4 mol to about 0.8 mol, or about 0.4 mol to about 0.6 mol based on 100 mol of titanium (Ti) in the grains 10a.

The metal oxide in the grains 10a may have an oxygen vacancy in the crystal structure thereof. The oxygen vacancy may result in loss of oxygen in the crystal structure. The metal oxide in the grains 10a may include oxygen in a lesser amount than a stoichiometric amount. The metal oxide in the grains 10a may exhibit semiconductor characteristics due to the oxygen vacancy. Accordingly, the metal oxide in the grains 10a may be a semiconductor metal oxide having semiconductor characteristics. Accordingly, one or more of the grains 10a may be a semiconductor grain.

The metal oxide in the grains 10a may be represented by Chemical Formula 1.

$$(Ba_{1-x}RE_x)TiO_{3-\delta} \quad \text{Chemical Formula 1}$$

In Chemical Formula 1,
RE is at least one rare earth element,
$0<x\leq0.02$, and
$0<\delta<3$.

In Chemical Formula 1, RE may be lanthanum (La), yttrium (Y), bismuth (Bi), dysprosium (Dy), neodymium (Nd), samarium (Sm), holmium (Ho), or a combination thereof.

In Chemical Formula 1, x indicates a substitution degree of the rare earth element and may be, for example, in the range of $0<x\leq0.01$.

In Chemical Formula 1, δ indicates a degree of oxygen vacancy and may be, for example, in the ranges of $0.1\leq\delta<3$, $0.2\leq\delta\leq2.8$, $0.3\leq\delta\leq2.5$, $0.4\leq\delta\leq2.3$, or $0.5\leq\delta\leq2.0$.

A particle diameter 9 of the grains 10a may be about 0.001 micrometers (μm) to about 10 μm, for example, about 0.001 μm to about 8 μm, about 0.01 μm to about 7 μm, about 0.01 μm to about 6 μm, about 0.01 μm to about 5 μm, about 0.01 μm to about 4 μm, or about 0.01 μm to about 3 μm.

An average particle diameter of the grains 10a may be, for example, less than or equal to about 2.0 μm, less than or equal to about 1.8 μm, less than or equal to about 1.7 μm, less than or equal to about 1.5 μm, less than or equal to about 1.4 μm, less than or equal to about 1.3 μm, less than or equal to about 1.2 μm, less than or equal to about 1.1 μm, less than or equal to about 1.0 μm, less than or equal to about 900 nanometers (nm), less than or equal to about 800 nm, less than or equal to about 700 nm, less than or equal to about 600 nm, less than or equal to about 500 nm, or less than or equal to about 300 nm, but is not limited thereto. An average particle diameter of the grains 10a may be, for example, greater than or equal to about 50 nm, greater than or equal to about 60 nm, greater than or equal to about 70 nm, greater than or equal to about 80 nm, greater than or equal to about 90 nm, or greater than or equal to about 100 nm, but is not limited thereto.

As described above, the grains 10a includes the barium titanium oxide doped with at least one rare earth element and the rare earth element may be distributed non-locally and uniformly through one or more of the grains 10a, preferably throughout the entirety of the one or more grains 10a. Accordingly, the grains 10a may have no separate shell and has a different structure from that of a conventional ferroelectric core-paraelectric shell composite obtained by coating a rare earth element oxide on the surface of barium titanium oxide.

The grain boundary 10b is positioned among grains 10a in the ceramic dielectric 10 and, for example, may have a continuously connected structure. In some embodiments a limited number of discontinuities may be present, i.e., not present between any two grains 10a. In these embodiments, the grain boundaries 10b may not completely surround surface 7 of grains 10a. In some embodiments, greater than 80%, or greater than 90%, preferably greater than 95%, more preferably greater than 98% of the surfaces of grains 10a are surrounded by a grain boundary 10b. The grain boundary 10b may have a narrower width than that of a particle diameter 9 of the grains 10a, for example, a width of less than about 20%, less than about 15%, or less than about 10% of the average particle diameter of the grains 10a.

The grain boundary 10b may include a metal oxide located between adjacent grains 10a. The grain boundary 10b may include an insulative metal oxide in contrast to the grains 10a. The grain boundary 10b may include for example a metal oxide including manganese (Mn), magnesium (Mg), aluminum (Al), iron (Fe), scandium (Sc), gallium (Ga), or a combination thereof, wherein manganese (Mn), magnesium (Mg), aluminum (Al), iron (Fe), scandium (Sc), gallium (Ga), or a combination thereof may be an acceptor element. The acceptor element may include, for example, manganese (Mn).

The insulative metal oxide in the grain boundary 10b may be represented by Chemical Formula 2.

$$M_2O_3 \quad \text{Chemical Formula 2}$$

In Chemical Formula 2,
M may be an acceptor element, for example, manganese (Mn), magnesium (Mg), aluminum (Al), iron (Fe), scandium (Sc), gallium (Ga), or a combination thereof.

A part of the acceptor elements may be diffused from the grain boundary 10b into the grains 10a and thus be present in a part of the grains 10a. For example, the acceptor elements may be distributed within about 30 percent, about 20 percent, or about 10 percent of a particle diameter 9 of the grains 10a, starting from the surface 7 of the grains 10a.

Accordingly, the ceramic dielectric 10 may be divided depending on: a distribution of the acceptor elements into the grain boundary 10b where the acceptor elements are distributed; a center region 6 of the grains 10a where barium (Ba), titanium (Ti), and a rare earth element are present, but the acceptor elements may not be present; and a boundary region 10b of the grains 10a where the acceptor elements are distributed along with barium (Ba), titanium (Ti), and a rare earth element.

The center region 6 of the grains 10a may include a metal oxide represented by Chemical Formula 1 as described herein and below.

$$(Ba_{1-x}RE_x)TiO_{3-\delta} \quad \text{Chemical Formula 1}$$

In Chemical Formula 1,
RE may be a rare earth element, for example, lanthanum (La), yttrium (Y), bismuth (Bi), dysprosium (Dy), neodymium (Nd), samarium (Sm), holmium (Ho), or a combination thereof,
$0<x\leq0.02$, and
$0<\delta<3$.

The boundary region of the grains 10a may include, for example, a composite material of a metal oxide represented by Chemical Formula 3 below.

$$(Ba_{1-x}RE_x)TiO_{3-\delta}+yM_2O_3 \quad \text{Chemical Formula 3}$$

In Chemical Formula 3,
RE may be a rare earth element, for example, lanthanum (La), yttrium (Y), bismuth (Bi), dysprosium (Dy), neodymium (Nd), samarium (Sm), holmium (Ho), or a combination thereof,
M may be an acceptor element, for example, manganese (Mn), magnesium (Mg), aluminum (Al), iron (Fe), scandium (Sc), gallium (Ga), or a combination thereof,
$0<x\leq0.02$, $1.0\leq y\leq2.0$, and
$0<\delta<3$.

The grain boundary 10b may include an insulative metal oxide represented by Chemical Formula 2 as described herein and above.

$$M_2O_3 \quad \text{Chemical Formula 2}$$

In Chemical Formula 2, M is an acceptor element and is manganese (Mn), magnesium (Mg), aluminum (Al), iron (Fe), scandium (Sc), gallium (Ga), or a combination thereof.

The acceptor elements may be primarily present in the grain boundary 10b. In some embodiments, the acceptor element diffuses from the grain boundary 10b into the grain particles 10a. For example, the acceptor element may be distributed within about 10% of a particle diameter of the semiconductor grain from a surface of the semiconductor grain 10a ("the boundary region"). Within this range, the acceptor element may be distributed within about 0.1% to about 10%, or within about 0.5% to about 8% of a particle diameter of the semiconductor grain from a surface of the semiconductor grain 10a. For example, the acceptor elements present in the grain boundary 10b may be for example greater than or equal to about 1.2 times, greater than or equal to about 1.3 times, greater than or equal to about 1.4 times, greater than or equal to about 1.5 times, greater than or equal to about 1.8 times, or, greater than or equal to about 2 times as much as those present in the boundary region of the grains 10a.

The acceptor element may be included in an amount of about 0.5 mol to about 2 mol based on 100 mol of titanium (Ti) in the ceramic dielectric 10.

Accordingly, the ceramic dielectric 10 may include a thin grain boundary 10b among neighboring semiconductor grains 10a and thus may secure a high dielectric constant. In addition, the ceramic dielectric may include an insulative oxide including acceptor elements in the grain boundary, and thus may realize high resistivity. Accordingly, the ceramic dielectric 10 may simultaneously realize both a high dielectric constant and high resistivity.

In an exemplary embodiment, the ceramic dielectric 10 may have a dielectric constant of greater than or equal to about 6,000, a dielectric loss of less than or equal to about 0.1, and resistivity of greater than or equal to about $1 \times 10^{10}$ ohm·centimeters ( ), for example, a dielectric constant of greater than or equal to about 8,000, a dielectric loss of less than or equal to about 0.09, and resistivity of greater than or equal to about $5 \times 10^{10}$ Ω·cm, a dielectric constant of greater than or equal to about 10,000, a dielectric loss of less than or equal to about 0.08, and resistivity of greater than or equal to about $1 \times 10^{11}$ Ω·cm, or a dielectric constant of greater than or equal to about 12,000, a dielectric loss of less than or equal to about 0.08, and resistivity of greater than or equal to about $1 \times 10^{11}$ Ω·cm.

Hereinafter, a method of manufacturing a ceramic dielectric according to an embodiment is described.

Figure 2:
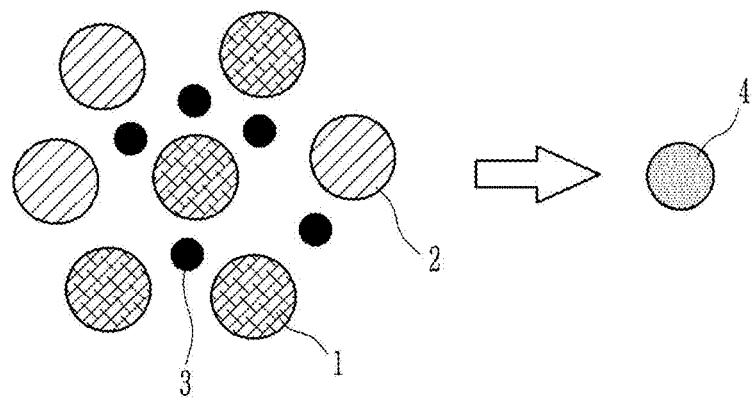
FIGS. 2 to 4 are schematic views that sequentially illustrate an exemplary embodiment of a manufacturing method of the ceramic dielectric of FIG. 1 according to the present invention.
Figure 3:
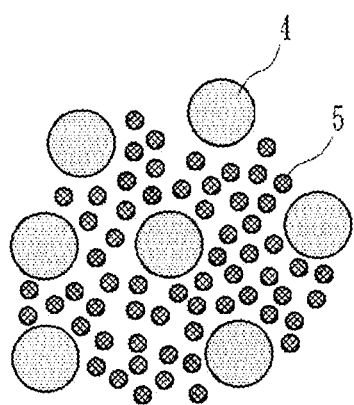
Figure 4:
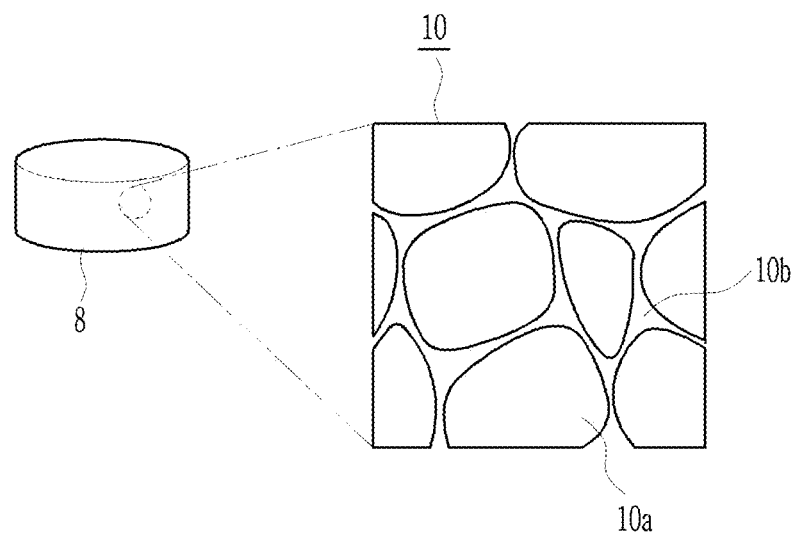

FIGS. 2 to 4 are schematic views sequentially showing a manufacturing method of the ceramic dielectric of FIG. 1 according to an embodiment.

Referring to FIG. 2, a barium precursor 1, a titanium precursor 2, and a rare earth element precursor 3 are mixed and heat-treated to obtain a mother material powder 4 including a barium titanium oxide doped with a rare earth element.

The barium precursor 1 may be for example a barium oxide, a barium carbonate salt, or a barium hydroxide, for example, $BaCO_3$, $BaO$, or $Ba(OH)_2$. The titanium precursor 2 may be for example a titanium oxide, a titanium carbonate salt, a titanium hydroxide, or a titanium acetate salt, for example, $TiO_2$ and/or $Ti(OH)_4$. The at least one rare earth element precursor 3 may be for example an oxide of a rare earth element, a carbonate salt of a rare earth element, or an acetate salt of a rare earth element, for example, $RE_2O_3$ and/or $RE_2CO_3$ (wherein RE is a rare earth element), but is not limited thereto.

The barium precursor 1 and the titanium precursor 2 may be included in a mole ratio of about 0.8 to 1.2 to about 1.2 to 0.8, for example, about 0.9 to 1.1 to about 1.1 to 0.9.

The rare earth element precursor 3 may be included in an amount of less than or equal to about 1 mol based on 100 mol of titanium (Ti) in the barium precursor 1, the titanium precursor 2, and the rare earth element precursor 3. Within the range, the rare earth element precursor 3 may be for example included in an amount of about 0.1 mol to about 1 mol, for example about 0.2 mol to about 0.8 mol, about 0.3 mol to about 0.7 mol, about 0.4 mol to about 0.6 mol based on 100 mol of titanium (Ti) in the barium precursor 1, the titanium precursor 2, and the rare earth element precursor 3.

The mother material powder 4 may be for example obtained by a solid-phase synthesis, a liquid synthesis, a gas-phase synthesis, or a hydrothermal synthesis, but is not limited thereto. For example, the heat-treating may be for example performed in air. The heat treating may be performed for example at a temperature of about 700° C. to about 1200° C., about 600° C. to about 1000° C., or about 600° C. to about 800° C.

Subsequently, referring to FIG. 3, the mother material powder 4 may be mixed with an acceptor element precursor 5 including manganese (Mn), magnesium (Mg), aluminum (Al), iron (Fe), scandium (Sc), gallium (Ga), or a combination thereof.

The acceptor element precursor 5 may be an oxide, a carbonate salt, or an acetate salt including manganese (Mn), magnesium (Mg), aluminum (Al), iron (Fe), scandium (Sc), gallium (Ga), or a combination thereof. For example, when the acceptor element is manganese (Mn), the acceptor element precursor 5 may be $Mn_2O_3$ and/or $MnCO_3$.

The acceptor element precursor 5 may be supplied in an amount of about 0.5 mol to about 2 mol based on 100 mol of the titanium precursor 2.

During mixing of the mother material powder 4 with the acceptor element precursor 5, a sintering agent may be further included. The sintering agent may be for example an oxide or a glass compound including silicon (Si), lithium (Li), calcium (Ca), or a combination thereof, but is not limited thereto. For example, the sintering agent may be for example $SiO_2$. The sintering agent may be supplied in an amount of about 0.1 mol to about 5 mol, for example about 0.3 mol to about 2 mol, about 0.1 mol to about 1.5 mol based on 100 mol of the mother material powder 4.

Subsequently, a mixture of the mother material powder 4 and the acceptor element precursor 5 may be molded into a predetermined shape. The molding may include for example compression molding, for example, cold compression molding or uniaxial molding, but is not limited thereto. For example, the mixture may be pressed at about 100 megaPascal (MPa) to about 500 MPa to provide a three-dimensional compact article 8, such as a disk.

Referring to FIG. 4, the compact article 8 is sintered to provide a ceramic dielectric 10. The sintering may be performed at a different atmosphere and/or temperature continuously, and may include, for example, primary heat treatment under a strong reduction atmosphere and secondary heat treatment under a weak oxidizing atmosphere.

The primary heat treatment under the strong reduction atmosphere may be performed at a high temperature of greater than or equal to 1000° C. under a dry gas atmosphere and the secondary heat treatment under the weak oxidizing atmosphere may be performed at a lower temperature than the strong reduction atmosphere under an air and/or wet gas atmosphere. For example, the primary heat treatment under the strong reduction atmosphere may be performed at a high temperature of greater than or equal to 1000° C. under a dry $H_2$ gas or a dry $N_2/H_2$ mixed gas atmosphere and the secondary heat treatment under the weak oxidizing atmosphere may be, for example, performed at a lower temperature than the strong reduction atmosphere under an air and/or wet $N_2$ atmosphere. For example, the strong reduction atmosphere may be a 100% dry $H_2$ gas or a dry $N_2/H_2$ mixed gas atmosphere in a $N_2:H_2$ volume ratio of about 1:99 to about 99:1, about 10:90 to about 90:10, about 20:80 to about 80:20, about 30:70 to about 70:30, about 40:60 to about 60:40, or about 50:50. The weak oxidizing atmosphere may be a 100% wet $N_2$ gas or a wet $N_2/H_2$ mixed gas atmosphere in a $N_2:H_2$ volume ratio of about 1:99 to about 99:1, about 10:90 to about 90:10, about 20:80 to about 80:20, about 30:70 to about 70:30, about 40:60 to about 60:40, or about 50:50. The primary heat treatment and the secondary heat treatment may be independently performed for about 1 hour to about 6 hours, for example about 2 hours to 4 hours.

In an exemplary embodiment, the strong reduction atmosphere may be for example a $N_2/H_2$ mixed gas atmosphere and a temperature of about 1100° C. to about 1400° C. and the weak oxidizing atmosphere may be for example an air and/or wet $N_2$ atmosphere with a temperature of about 600° C. to about 800° C. Within the ranges, the strong reduction atmosphere may have a temperature of about 1200° C. to 1300° C. and the weak oxidizing atmosphere may have a temperature of for example about 650° C. to 800° C. The primary heat treatment and the secondary heat treatment may be independently performed for about 1 hour to about 6 hours, for example, about 2 hours to about 4 hours. The heat treatment temperature and the time under the strong reduction atmosphere and the weak oxidizing atmosphere may be variously controlled according to desirable dielectric constants and resistivity.

The obtained ceramic dielectric 10 may include a plurality of grains 10a formed from the mother material powder 4 and the grain boundary 10b located and filling between adjacent grains 10a and formed from the acceptor element precursor 5. The grains 10a may include a barium titanium oxide doped with the rare earth element and the grain boundary 10b may include an insulative oxide including the acceptor element.

Accordingly, oxygen vacancy in grains 10a may be sufficiently ensured through sequential heat treatments under the strong reduction atmosphere and the weak oxidizing atmosphere and thus, the ceramic dielectric 10 having high resistivity may be obtained.

Accordingly, through the consecutive heat treatment under the weak oxidizing atmosphere after heat treatment under the strong reduction atmosphere, loss of oxygen vacancy in the grains 10a may be effectively prevented or substantially reduced to ensure sufficient oxygen vacancy and thus, a ceramic dielectric 10 having a high dielectric constant and including the semiconductor grains may be obtained.

Hereinafter, a ceramic electronic component is described.

Figure 5:
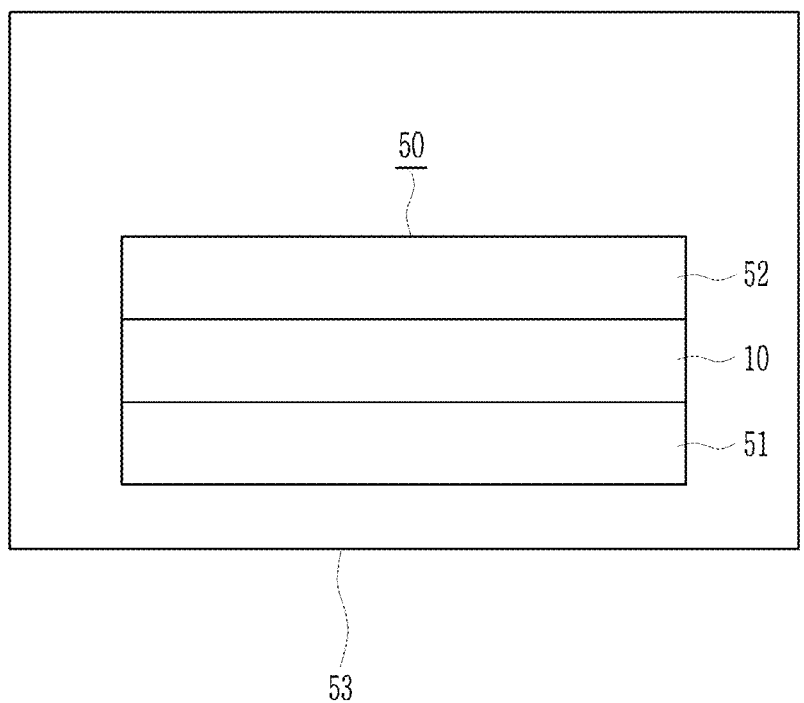
FIG. 5 is a schematic view illustrating an exemplary embodiment of a ceramic electronic component according to the present invention.

FIG. 5 is a schematic view of a ceramic electronic component 50 according to an embodiment. FIG. 5 shows a capacitor 50 that is an example of the ceramic electronic component. Referring to FIG. 5, a capacitor 50 according to an embodiment includes a pair of electrodes 51 and 52 facing each other and a ceramic dielectric 10. An electronic device 53, for example, a computer and/or mobile phone, may include the electronic component 50, for example, the capacitor 50.

The pair of electrodes 51 and 52 include a conductor such as a metal, for example, nickel (Ni), gold (Au), platinum (Pt), palladium (Pd), copper (Cu), silver (Ag), tin (Sn), an alloy thereof, or a combination thereof, but are not limited thereto. The pair of electrodes 51 and 52 may be, for example, a metal plate, a conductive layer disposed on a substrate (not shown), or a metal-plated plate on a substrate (not shown). Herein, the substrate may be, for example, a glass substrate, a semiconductor substrate, a polymer substrate, or a combination thereof, but is not limited thereto. The ceramic dielectric 10 may be the same as described above.

Figure 6:
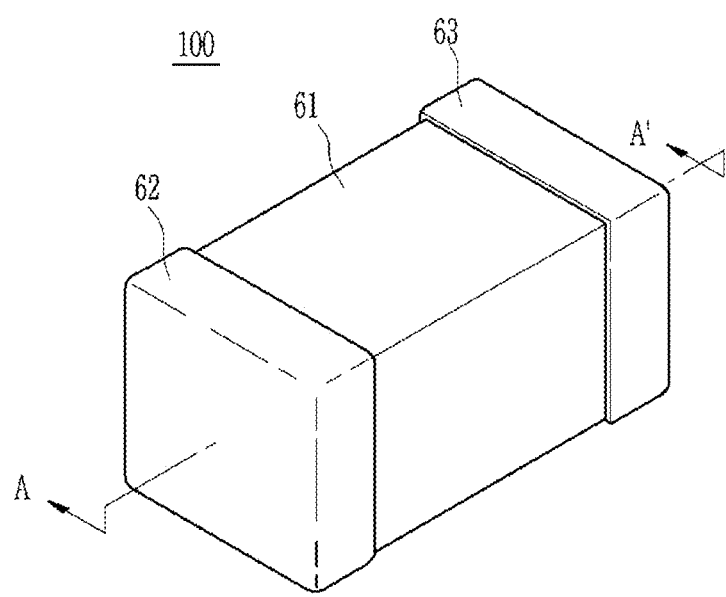
FIG. 6 is a schematic view illustrating an exemplary embodiment of a ceramic electronic component according to the present invention.
Figure 7:
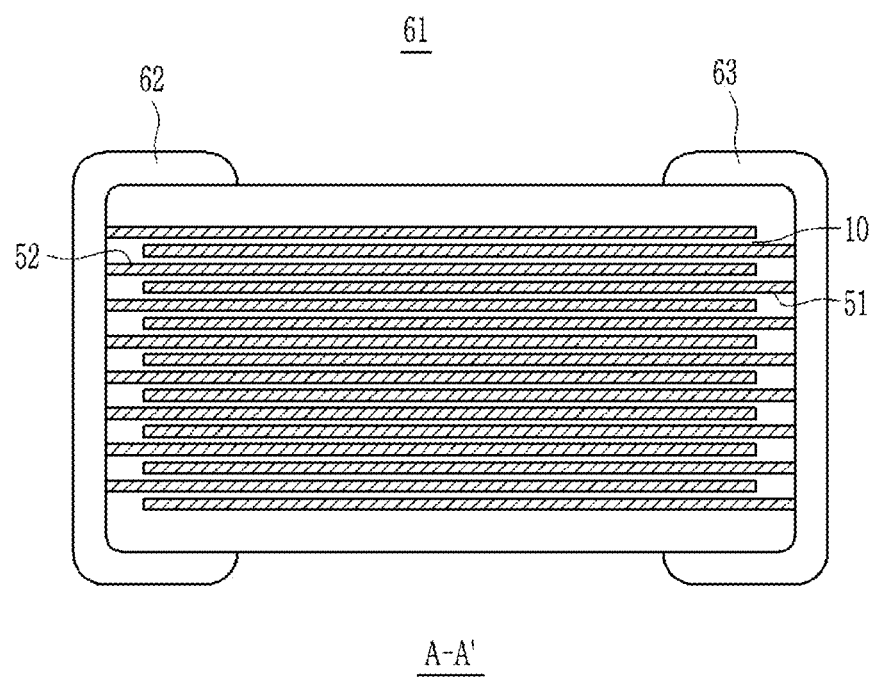
FIG. 7 is a cross-sectional view illustrating an exemplary embodiment of the ceramic electronic component of FIG. 6 taken along line A-A' according to the present invention.

FIG. 6 is a schematic perspective view of a ceramic electronic component 100 according to another embodiment and FIG. 7 is a cross-sectional view of the ceramic electronic component of FIG. 6 taken along line A-A'.

The ceramic electronic component 100 according to the present embodiment may be a multilayer ceramic capacitor ("MLCC") 100 having a laminate structure wherein a plurality of the capacitors of FIG. 5 are laminated as a unit capacitor.

Referring to FIGS. 6 and 7, the multilayer ceramic capacitor 100 includes a capacitor body 61 and external electrodes 62 and 63. The capacitor body 61 may have a laminate structure wherein a plurality of the capacitors 50 of FIG. 5 are laminated, and each of the capacitors includes the electrodes (internal electrodes) 51 and 52 and the ceramic dielectric 10 as described above. The details therefor are the same as described above.

As one example of the ceramic electronic component, a capacitor and a multi-layer ceramic capacitor are described above, but the present disclosure is not limited thereto, and it may be applied to any electronic components using ceramic such as a piezoelectric device, a varistor, or a thermistor, etc.

The ceramic electronic component such as the capacitor and the multi-layer ceramic capacitor may be included in a variety of electronic devices, for example, an image device such as a liquid crystal display (LCD), a computer, and a mobile phone, or the like.

Hereinafter, the embodiments are illustrated in more detail with reference to examples. However, these examples are exemplary and the scope of the present disclosure is not limited thereto.

SYNTHESIS EXAMPLES

Synthesis Example 1

An exemplary embodiment of a ceramic dielectric is obtained in accordance with the present invention. 99.6 mole of $BaCO_3$, 99.6 mole of $TiO_2$, and 0.2 mole of $La_2O_3$ are added to ethanol, and the mixture is uniformly mixed with a ball mill for 24 hours. Subsequently, the mixed powder is mixed and dried in a beaker using a magnetic bar and a hot plate. The dried powder is dried additionally one day longer in an oven at 80° C. Subsequently, the mixture is calcinated in the air at 800 to 1000° C. for 4 to 8 hours to obtain La-doped barium titanium oxide.

Then, 0.25 g (1 mole percent) of $MnCO_3$ ($Mn_2O_3$) and 0.13 g of $SiO_2$ powder are added to 50 g of the obtained La doped barium titanium oxide and mixed therewith. Subsequently, the mixture is molded with a pressure of 250 MPa in a cold isostatic press to obtain a disk-shaped specimen.

The molded specimen is sintered under a dry $N_2/H_2$ mixed gas atmosphere at 1250° C. for 2 hours. Then, the sintered body is heat-treated under an air atmosphere at 700° C. for about 4 hours to obtain a ceramic dielectric.

Synthesis Example 2

A ceramic dielectric is obtained according to the same method as Synthesis Example 1 except that the heat-treatment of the sintered body occurred under a wet $N_2$ atmosphere at 600° C. for about 2 hours.

Synthesis Example 3

A ceramic dielectric is obtained according to the same method as Synthesis Example 1 except that 0.50 g (2 mole percent) of $MnCO_3$ ($Mn_2O_3$) is added instead of 0.25 g (1 mole percent) of $MnCO_3$ ($Mn_2O_3$) and heat-treatment of the sintered body occurred under an air atmosphere at 700° C. for about 2 hours.

Synthesis Example 4

A ceramic dielectric is obtained according to the same method as Synthesis Example 1 except that $MnCO_3$ ($Mn_2O_3$) in an amount of 2 mole percent is added instead of 1 mole percent and heat-treatment of the sintered body occurred under a wet $N_2$ atmosphere at 600° C. for about 2 hours.

Synthesis Example 5

A ceramic dielectric is obtained according to the same method as Synthesis Example 1 except that sintering of the molded specimen occurred at 1200° C. for 2 hours and heat-treatment of the sintered body occurred under a wet $N_2$ atmosphere at 650° C. for about 4 hours.

Comparative Synthesis Example 1

$BaCO_3$ and $TiO_2$ are mixed in a mole ratio of 1:1.003, the mixture is added to ethanol, and the obtained mixture is uniformly mixed with a ball mill for 24 hours. Subsequently, the mixed powder is mixed and dried in a beaker with a magnetic bar and a hot plate. The mixture is calcinated in the air at 900° C. for 4 hours to obtain barium titanium oxide.

Then barium titanium oxide is sintered under a dry $N_2/H_2$ mixed gas atmosphere at 1250° C. for 2 hours. Then, the sintered body is heat-treated under an air atmosphere at 700° C. for about 4 hours to obtain a $BaTiO_3$ ceramic dielectric.

Comparative Synthesis Example 2

$BaCO_3$ and $TiO_2$ are mixed in a mole ratio of 1:1.003, the mixture is added to ethanol, and the obtained mixture is uniformly mixed with a ball mill for 24 hours. Subsequently, the mixed powder is mixed and dried in a beaker with a magnetic bar and a hot plate. Then, the mixture is calcinated in the air at 900° C. for 4 hours to obtain barium titanium oxide.

Then, 0.25 g (1 mole percent) of $MnCO_3$ ($Mn_2O_3$) and 0.13 g of $SiO_2$ powder are added to 50 g of the obtained barium titanium oxide and mixed therewith. Then, the mixture is molded under a pressure of 250 MPa in a cold isostatic press to obtain a disk-shaped specimen.

Subsequently, the molded specimen is sintered under a dry $N_2/H_2$ mixed gas atmosphere at 1250° C. for 2 hours. The sintered body is heat-treated under an air atmosphere at 700° C. for about 4 hours to obtain a ceramic dielectric.

EVALUATION

Evaluation I

Figure 8:
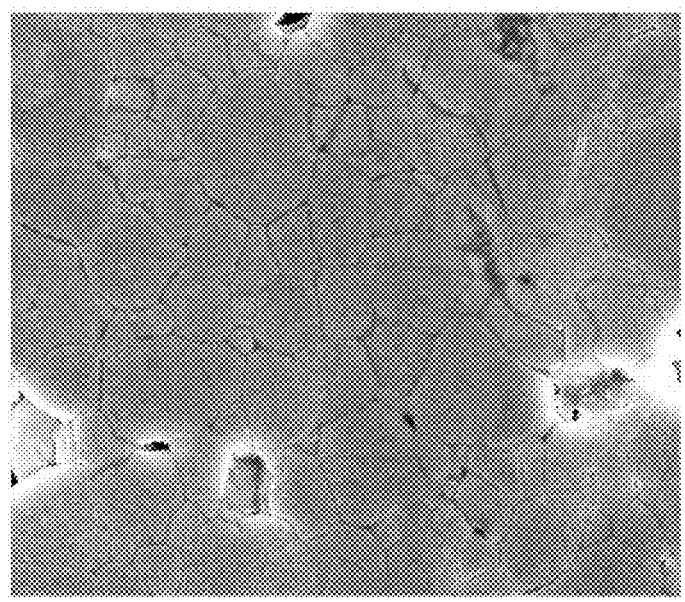
FIG. 8 is an electron scanning microscope (SEM) photograph illustrating an exemplary embodiment of the ceramic dielectric according to Synthesis Example 1.

FIG. 8 is an electron scanning microscope (SEM) photograph showing the ceramic dielectric according to Synthesis Example 1.

Referring to FIG. 8, the ceramic dielectric according to Synthesis Example 1 has a structure having a plurality of grains and a grain boundary located between adjacent grains.

Evaluation II

Figure 9:
FIG. 9 is a transmission electron microscope (TEM) photograph illustrating an exemplary embodiment of the ceramic dielectric according to Synthesis Example 5.

FIG. 9 is a transmission electron microscope (TEM) photograph showing the ceramic dielectric according to Synthesis Example 5. FIG. 9 shows a distribution of lanthanum (La) and manganese (Mn) depending on a position in the ceramic dielectric along line A-B-C.

Figure 10:
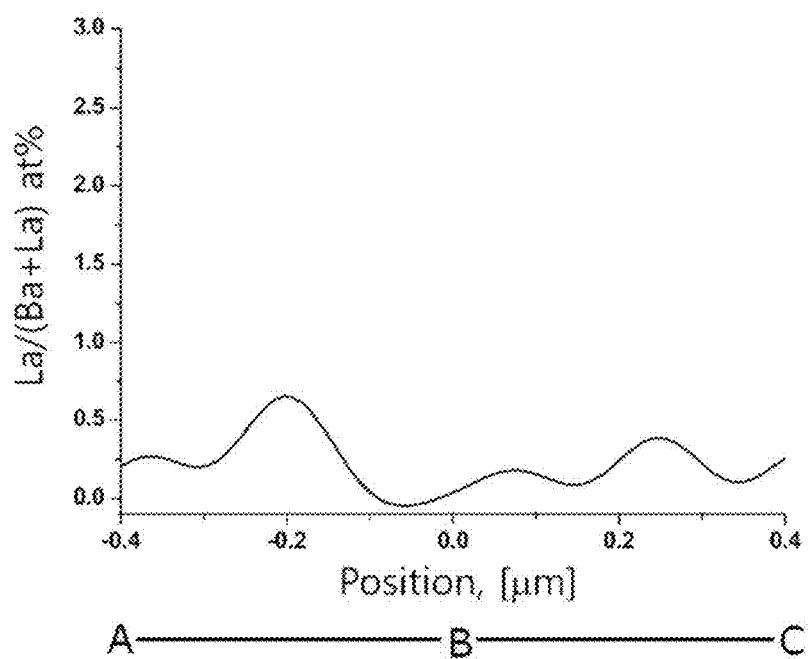
FIG. 10 is a graph illustrating a distribution percentage of lanthanum (La) according to a position (micrometers) along line A-B-C in the TEM photograph of the ceramic dielectric of FIG. 9.

FIG. 10 is a graph showing a distribution percentage of lanthanum (La) according to a position (micrometers) along line A-B-C as shown in the TEM photograph of the ceramic dielectric of FIG. 9. Referring to FIG. 10, the lanthanum is distributed over an entire grain but has no concentration gradient (e.g., uniform distribution) from the surface of the grain to a center thereof.

Figure 11:
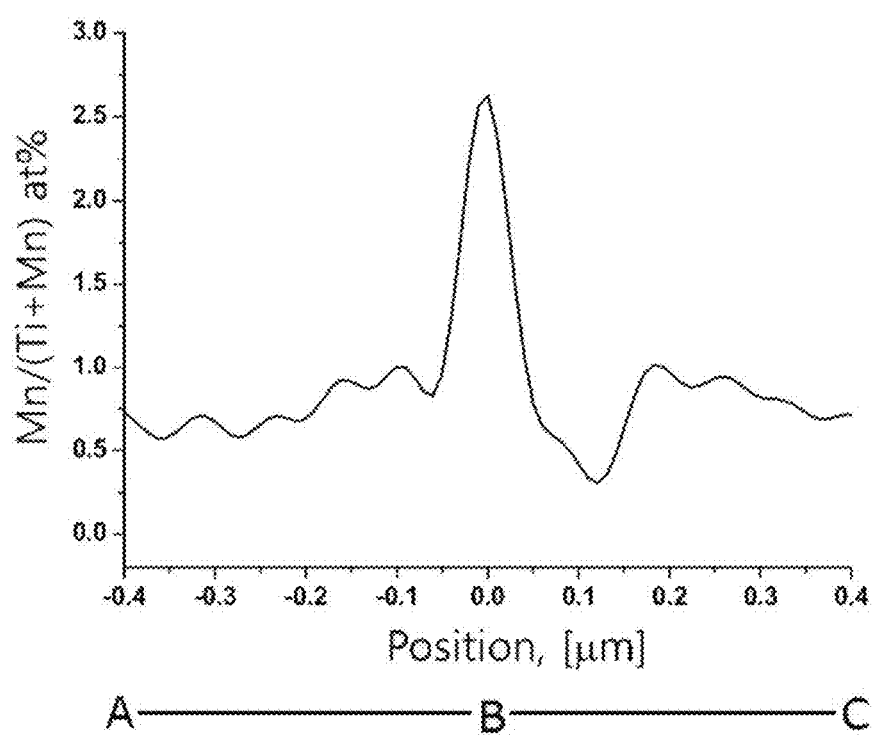
FIG. 11 is a graph illustrating a distribution percentage of manganese (Mn) according to a position (micrometers) along line A-B-C in the TEM photograph of the ceramic dielectric of FIG. 9.

FIG. 11 is a graph showing a distribution percentage of manganese (Mn) according to a position (micrometers) along line A-B-C as shown in the TEM photograph of the ceramic dielectric of FIG. 9. Referring to FIG. 11, the manganese is segregated in the grain boundary (the position B).

Evaluation III

A composition of each element of the ceramic dielectric according to Synthesis Example 1 is analyzed.

The composition of the ceramic dielectric is analyzed using an energy dispersion X-ray detector (EDS) (TECNAI G2 F20 S-TWIN).

The results are shown in Table 1 below.

TABLE 1

| Element | Ba | La | Ti | Mn | O |
| --- | --- | --- | --- | --- | --- |
| Mole percent | 22.03 | 0.20 | 25.3 | 0.17 | 52.3 |

Referring to Table 1, the ceramic dielectric according to Synthesis Example 1 has an oxygen to titanium ratio of about 2.07, thus indicating oxygen vacancy.

EXAMPLES

Example 1

An exemplary embodiment of a capacitor in accordance with the present invention is fabricated by coating In—Ga on both sides of the ceramic dielectric according to Synthesis Example 1 to obtain an electrode.

Example 2

A capacitor is fabricated according to the same method as Example 1 except the ceramic dielectric according to Synthesis Example 2 is used instead of the ceramic dielectric according to Synthesis Example 1.

Example 3

A capacitor is fabricated according to the same method as Example 1 except the ceramic dielectric according to Synthesis Example 3 is used instead of the ceramic dielectric according to Synthesis Example 1.

Example 4

A capacitor is fabricated according to the same method as Example 1 except the ceramic dielectric according to Synthesis Example 4 is used instead of the ceramic dielectric according to Synthesis Example 1.

Example 5

A capacitor is fabricated according to the same method as Example 1 except the ceramic dielectric according to Synthesis Example 5 is used instead of the ceramic dielectric according to Synthesis Example 1.

Comparative Example 1

A capacitor is fabricated according to the same method as Example 1 except the ceramic dielectric according to Comparative Synthesis Example 1 is used instead of the ceramic dielectric according to Synthesis Example 1.

Comparative Example 2

A capacitor is fabricated according to the same method as Example 1 except the ceramic dielectric according to Synthesis Example 2 is used instead of the ceramic dielectric according to Synthesis Example 1.

Comparative Example 3

Barium titanium oxide having a core-shell structure as described in J. Am. Ceram. Soc., 85[12] (2002) 3111 is used.
Evaluation IV The dielectric constant, dielectric loss, and resistivity (ohm centimeters) of the capacitors according to Examples 1 to 5 and Comparative Examples 1 to 3 are evaluated.

The dielectric constant and the dielectric loss are evaluated using a 4284A LCR meter, and the resistivity is evaluated using a Keithley 2400 meter.

The results are shown in Table 2.

TABLE 2

|  | Dielectric constant | Dielectric loss | Resistivity ($\Omega \cdot$ cm) |
| --- | --- | --- | --- |
| Example 1 | 12,500 | 0.027 | $2 \times 10^{11}$ |
| Example 2 | 18,900 | 0.03 | $6 \times 10^{10}$ |
| Example 3 | 22,000 | 0.011 | $2 \times 10^{11}$ |
| Example 4 | 11,200 | 0.02 | $1 \times 10^{11}$ |
| Example 5 | 18,000 | 0.03 | $2 \times 10^{11}$ |
| Comparative Example 1 | 290,000 | 0.17 | — |
| Comparative Example 2 | 1,700 | 0.02 | $4 \times 10^{10}$ |
| Comparative Example 3 | 3,500 | 0.01 | $1 \times 10^{12}$ |

Referring to Table 2, the capacitors according to Examples 1 to 5 have a dielectric constant of greater than or equal to 6,000, a dielectric loss of less than 0.1, and a resistivity of greater than or equal to $1 \times 10^{10}$ ohm centimeters. Accordingly, the capacitors according to Examples 1 to 5 have both a high dielectric constant and high resistivity.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:
1. A ceramic dielectric comprising:
a plurality of semiconductor grains, wherein one or more of the semiconductor grains comprises a semiconductor oxide, wherein the semiconductor oxide comprises barium, titanium, and at least one rare earth element; and
an insulative oxide between adjacent semiconductor grains and including an acceptor element, wherein the acceptor element comprises manganese, magnesium, aluminum, iron, scandium, gallium, or a combination thereof, wherein an amount of the acceptor element is about 0.5 mole to about 2 mole with respect to 100 mole of titanium.
2. The ceramic dielectric of claim 1, wherein a distribution of the rare earth element is distributed throughout the entirety of the one or more semiconductor grains.
3. The ceramic dielectric of claim 1, wherein one or more of the semiconductor grains further comprises a surface and a center, wherein a concentration of the rare earth element is uniform from the surface to the center of the semiconductor grain.
4. The ceramic dielectric of claim 1, wherein the semiconductor oxide comprises a crystal structure, wherein the crystal structure comprises an oxygen vacancy.
5. The ceramic dielectric of claim 1, wherein the semiconductor oxide comprises a perovskite structure, wherein the semiconductor oxide comprises $BaTiO_3$, and wherein the rare earth element is a donor element that substitutes a portion of a barium site in the $BaTiO_3$.
6. The ceramic dielectric of claim 1, wherein one or more of the semiconductor grains comprises a semiconductor oxide represented by Chemical Formula 1:

$$(Ba_{1-x}RE_x)TiO_{3-\delta} \quad \text{Chemical Formula 1}$$

wherein, in Chemical Formula 1,
RE is at least one rare earth element,
$0<x\leq0.02$, and
$0<\delta<3$.
7. The ceramic dielectric of claim 1, wherein the rare earth element comprises lanthanum, yttrium, bismuth, dysprosium, neodymium, samarium, holmium, or a combination thereof.
8. The ceramic dielectric of claim 1, wherein an amount of the rare earth element is less than or equal to about 1 mole with respect to 100 mole of titanium.
9. The ceramic dielectric of claim 1, wherein the insulative oxide is represented by Chemical Formula 2:

$$M_2O_3 \quad \text{Chemical Formula 2}$$

wherein, in Chemical Formula 2,
M is manganese, magnesium, aluminum, iron, scandium, gallium, or a combination thereof.
10. The ceramic dielectric of claim 1, wherein the insulative oxide forms a grain boundary located between adjacent semiconductor grains.
11. The ceramic dielectric of claim 10, wherein the semiconductor grain includes the acceptor element of the grain boundary, and
the acceptor element is distributed within about 10% of a particle diameter of the semiconductor grain from a surface of the semiconductor grain.

12. The ceramic dielectric of claim 11, wherein the grain boundary comprises an amount of the acceptor element that is greater than or equal to about 1.2 times an amount of the acceptor element in the plurality of semiconductor grains.

13. The ceramic dielectric of claim 1, wherein the ceramic dielectric has a dielectric constant of greater than or equal to about 6,000 and/or a resistivity of greater than or equal to about $1\times10^{10}$ ohm centimeters at room temperature.

14. A ceramic dielectric comprising:
a grain comprising:
barium;
titanium; and
a donor element comprising lanthanum, yttrium, bismuth, dysprosium, neodymium, samarium, holmium, or a combination thereof; and
a grain boundary comprising an acceptor element, wherein the acceptor element comprises manganese, magnesium, aluminum, iron, scandium, gallium, or a combination thereof, wherein an amount of the acceptor element is about 0.5 mole to about 2 mole with respect to 100 mole of titanium,
wherein the barium, the titanium, and the donor element are non-locally distributed in the grain.

15. The ceramic dielectric of claim 14, wherein the grain comprises a crystal structure, wherein the crystal structure comprises an oxygen vacancy.

16. The ceramic dielectric of claim 14, wherein an amount of the donor element is less than or equal to about 1 mole with respect to 100 mole of titanium.

17. The ceramic dielectric of claim 14, wherein the grain comprises the acceptor element diffused from the grain boundary and
the acceptor element is distributed within about 10% of a particle diameter of the grain from a surface of the grain.

18. The ceramic dielectric of claim 14, wherein the grain is a semiconductor and/or the grain boundary is an insulator.

19. A method of manufacturing a ceramic dielectric, the method comprising:
heating a barium precursor, a titanium precursor, and a rare earth element precursor to obtain a barium titanium oxide doped with a rare earth element;
mixing the barium titanium oxide doped with the rare earth element with an acceptor element precursor to obtain a mixture, wherein the acceptor element precursor comprises manganese, magnesium, aluminum, iron, scandium, gallium, or a combination thereof, wherein an amount of the acceptor element is about 0.5 mole to about 2 mole with respect to 100 mole of titanium; and
sintering the mixture to obtain a plurality of grains comprising the barium titanium oxide doped with the rare earth element and an insulative oxide located between adjacent grains,
wherein sintering the mixture comprises:
primary heat treatment under a reduction atmosphere, and
secondary heat treatment under an oxidizing atmosphere.

20. The method of claim 19, wherein an amount of the rare earth element precursor is less than or equal to about 1 mole with respect to 100 mole of the titanium precursor.

21. The method of claim 19, wherein the reduction atmosphere comprises a $N_2/H_2$ mixed gas and wherein a temperature of the reduction atmosphere is about 1100° C. to about 1400° C.

22. The method of claim 19, wherein the oxidizing atmosphere comprises air and/or wet $N_2$ and wherein a temperature of the oxidizing atmosphere is about 600° C. to about 800° C.

23. The method of claim 19, further comprising compression-molding the mixture prior to sintering the mixture.

24. A ceramic electronic component, comprising
a pair of electrodes facing each other; and
a ceramic dielectric layer located between the pair of electrodes,
wherein the ceramic dielectric layer comprises:
a plurality of semiconductor grains, wherein one or more of the semiconductor grains comprises a semiconductor oxide, wherein the semiconductor oxide comprises barium, titanium, and a rare earth element; and
an insulative oxide comprising an acceptor element, wherein the insulative oxide is located between adjacent semiconductor grains and wherein the acceptor element comprises manganese, magnesium, aluminum, iron, scandium, gallium, or a combination thereof, wherein an amount of the acceptor element is about 0.5 mole to about 2 mole with respect to 100 mole of titanium.

25. The ceramic electronic component of claim 24, wherein
the ceramic electronic component comprises a multilayer ceramic capacitor, wherein the multilayer ceramic capacitor comprises a plurality of unit capacitors, and wherein the pair of electrodes and/or the ceramic dielectric layer are laminated.

26. An electronic device comprising the ceramic electronic component of claim 24.

* * * * *